W. P. SIMPSON.
HARNESS FOR AGRICULTURAL IMPLEMENTS.
APPLICATION FILED FEB. 28, 1919.
1,313,921.
Patented Aug. 26, 1919.
2 SHEETS—SHEET 2.
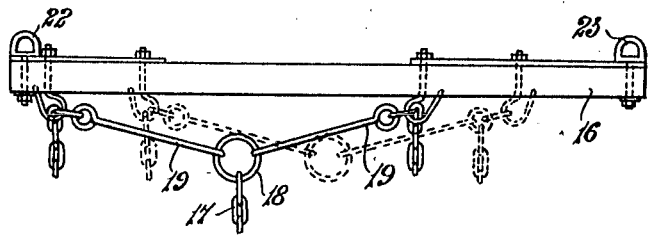
FIG_6_
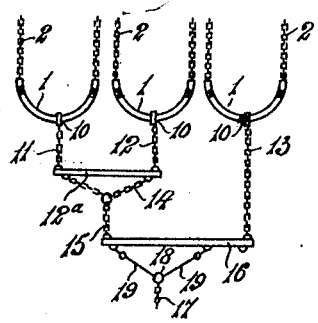
FIG_7_
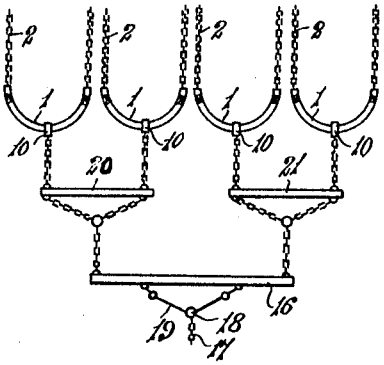
FIG_8_
Inventor
W. P. Simpson
By H. R. Kerslake
Atty

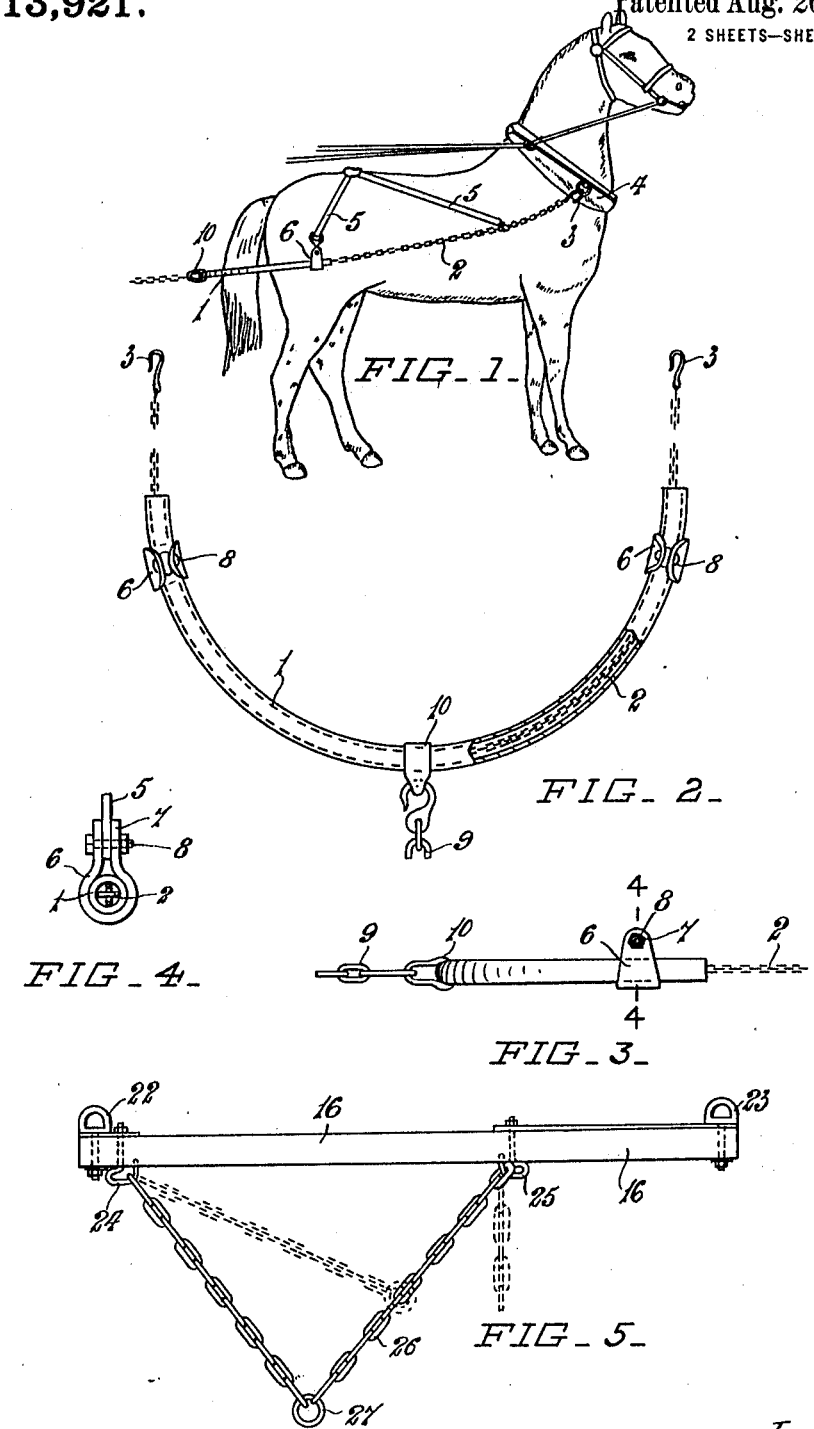

UNITED STATES PATENT OFFICE.

WILLIAM PETER SIMPSON, OF HAUPAI, NEW ZEALAND.

HARNESS FOR AGRICULTURAL IMPLEMENTS.

1,313,921.  Specification of Letters Patent. Patented Aug. 26, 1919.

Application filed February 28, 1919. Serial No. 279,790.

*To all whom it may concern:*

Be it known that I, WILLIAM PETER SIMPSON, a citizen of the Dominion of New Zealand, and residing at Haupai, in the Provincial District of Auckland, in the Dominion of New Zealand, have invented certain new and useful Improvements in Improved Harness for Agricultural Implements, of which the following is a specification.

This invention relates to harness for attaching agricultural implements to horses, and more especially to implements used for cultivating between fruit trees of an orchard, or used where space is limited such as in the galleries of mines, timber yards and the like.

The invention comprises tubular swingletrees bent into semicircles, through which the traces consisting each of a single chain are passed and are slidable.

The sliding of the trace chains in the tubular swingletrees allows greater freedom of movement to the horses. The curving of the swingletrees obviates the disadvantages of straight swingletrees, which are liable to catch the branches and trunks of trees or other obstacles.

The ends of the trace chains have hooks for attaching to the horses' collars. The swingletrees are supported by spider harness, consisting of straps crossed upon the backs of the horses, and provided with saddles. The ends of the straps are connected to the swingletrees by links and clips which are adjustable to right or left around the swingletree to regulate the balance of the same.

The drawings herewith illustrate the invention:—

Figure 1 is a side elevation of a set of harness in position on a horse.

Fig. 2 is a plan, and

Fig. 3 a side elevation of the swingletree.

Fig. 4 is a cross section on line 4—4, Fig. 3.

Fig. 5 is a plan of doubletree as used with the swingletrees.

Fig. 6 is a plan of a modification of a doubletree.

Fig. 7 is a plan of the harness as arranged for three horses, and

Fig. 8 is a plan of the harness as arranged for four horses.

The swingletree comprises a tube 1 bent into the semicircular form shown in Fig. 2, and the trace chain 2 passes through and is slidable in the tube. The ends of the chain are provided with hooks 3 for attachment to the collar 4. The tube 1 fits closely around the rear of the horse, so that there are no projections to catch against trees or other obstacles.

The tube 1 and the chain 2 are supported by spider harness 5, the tube being provided with clips 6, which embrace the tube and have ears 7 through which bolts 8 pass and make the clips grip the tube. The clips can be adjusted to any desired position upon the tube by releasing the bolts 8.

A clip 10 is provided at the rear of the tube 1 and when three horses are to be used with 3 sets of harness, chains 11, 12 and 13 are attached respectively to the clips 10. The chains 11 and 12 are attached to a swingletree 12$^a$ of ordinary construction and chains 14 and 15 connect the swingletree 12$^a$ to one end of a doubletree 16, the chain 13 being attached to the other end of the said doubletree. The implement to be drawn is attached by a chain 17 to a ring 18, which connects links 19 of equal length and which are connected to the doubletree, so that when three horses are to be used the ring 18 is twice the distance that it is distant from the chain 15, from the chain 13, see Fig. 7. The pull of the two horses on the chain 15 is thereby equalized to the pull of the single horse on the chain 13.

When four horses are to be used, see Fig. 8, two swingletrees 20 and 21 are used, to each of which two swingletrees 1 are attached, the swingletrees 20 and 21 being in turn attached to the ends of the doubletree 16, and the links arranged so that their ring 18 is located centrally between the ends of the doubletree.

Referring to Fig. 5, the doubletree 16, is provided with draw bolts 22 and 23 at its ends, and with a chain hook 24 at one end, another chain hook 25 near the other end, the distance between the eyebolt 22 and the hook 25 being twice the distance of the hook 25 from the eyebolt 23. The draw chain 26 has a ring 27 at its middle part, so that when the chains are fully extended from the hooks 24 and 25 as shown in Fig. 5, then the ring 27 lies centrally between the eyebolt 22 and the hook 25, as required when three horses are to be used. When four horses are to be used the chain 26 is adjusted on the hook 25 so that the ring 27 lies centrally between the eyebolts 22 and 23.

What I do claim and desire to obtain by Letters Patent of the United States is:—

1. Harness for agricultural implements comprising semicircular tubes, traces passing through and slidable in the tubes, means for supporting the tubes and traces and means adjustably mounted on the tubes for attaching the supporting means, substantially as set forth.

2. Harness for agricultural implements comprising tubes bent into a semicircular shape, trace chains passing through and slidable in the tubes, crossed straps supporting the tubes and chains, and clips adjustable on the tubes for attaching the straps, substantially as set forth.

In testimony whereof I have signed my name to this specification in the presence of two witnesses.

WILLIAM PETER SIMPSON.

Witnesses:
W. PRICHE,
D. E. RAPSON.

Copies of this patent may be obtained for five cents each, by addressing the "Commissioner of Patents, Washington, D. C."